Dec. 30, 1930.  L. F. MERRILL  1,786,859

SOUND SOURCE LOCATING MEANS

Filed Sept. 28, 1927

INVENTOR.
LELAND F. MERRILL.

BY Joseph B. Gardner
ATTORNEY

Patented Dec. 30, 1930

1,786,859

UNITED STATES PATENT OFFICE

LELAND FISKE MERRILL, OF OAKLAND, CALIFORNIA

SOUND-SOURCE-LOCATING MEANS

Application filed September 28, 1927. Serial No. 222,557.

My invention relates to a sound source locating means particularly designed for use in locating a source of sound with respect to a movable object such as a ship.

An object of the invention is to provide a device of the character described which may be used with particular accuracy in locating sources of sound by other than visual means, whereby invisible objects may be located both as to their direction and distance from the device.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
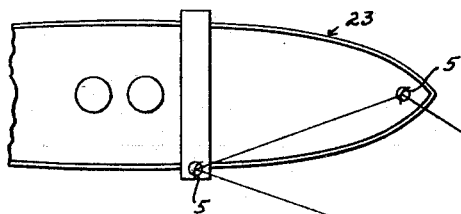
Figure 1 is a generally diagrammatic plan view showing an installation of the device on a ship.
Figure 2:
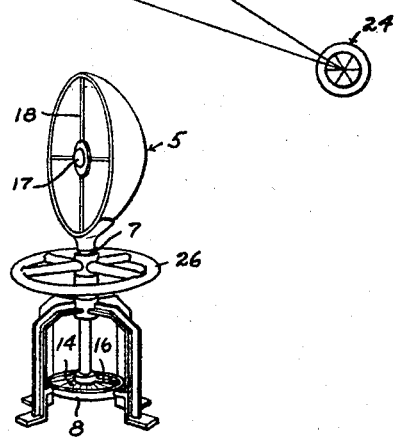
Figure 2 is a perspective of a sound collecting and concentrating unit forming part of the device.
Figure 3:
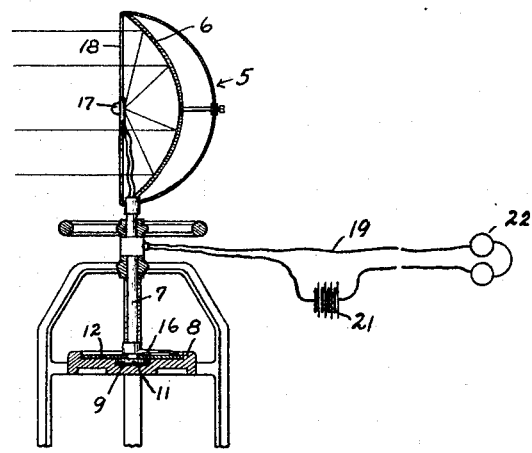
Figure 3 is a sectional view through the unit shown in Figure 2 together with a diagrammatic representation of an electrical circuit operatively associated therewith.

As is well known, it is frequently necessary to ascertain the location of a ship both with respect to relatively fixed guides to navigation and with respect to other ships. When the visibility is good, the vision of one or more observers is usually depended on, but when the visibility is poor as in the case of fog or smoke interposed between a ship and an object to be seen, acoustic means are the only recourse. Under the latter circumstance, it has heretofore been customary to judge both the direction and distance to a sound source directly by ear, but such a method is very inaccurate, particularly as to the judgment of distances. In accordance with my invention, however, a device is provided whereby both the direction and distance of a source of sound from a ship may be determined acoustically with an extremely high degree of accuracy.

Essentially, the device of my invention comprises the use of two or more sound receiving and concentrating units 5 mounted at different parts of the ship and each arranged to be adjusted to receive a maximum amount of sound from a given sound source, such adjusted settings being arranged to serve singly to indicate the direction of the sound and collectively to positively locate the source of the sound with respect to the ship. Each of the units 5 comprises a concave, and preferably parabolic, reflector 6 mounted on a standard 7, which standard is in turn mounted for rotation about the longitudinal axis thereof on a base 8 of generally disc shape. The standard 7 may be mounted on the base 8 in any suitable manner, and as here shown, the latter is provided with an annnular seat 9 in which a radial flange 11 provided at the bottom end of the standard 7 is arranged to seat. To secure the standard to the base, an annular ring 12 is utilized, such ring being secured to the top of the base in a suitable manner and having the inner portion thereof closely overlie the flange 11 to permit the rotation of the standard in the base. A scale 14 of circular form is provided on an upper face of the base 8 or of the ring 12, such scale providing suitable indicia and said standard being provided with a radial pointer 16 arranged to be variably disposed over the scale in accordance with the rotative position of the standard.

The axis of the standard 7 is arranged to be disposed vertically and the reflector is fixed thereto with its axis of curvature perpendicular to the axis of the standard whereby the reflector axis will always lie in a plane perpendicular to the standard axis. It will now be clear that if the axis of the reflector be directed toward a distant source of sound, that the sound from such source striking the reflector will be concentrated at the focal point of the reflector, and that the loudness of the sound at such focal point will be greatest when the axis of the reflector lies in a vertical plane including the source of sound and the standard axis. In this manner, the axis of the reflector may be accurately pointed toward the source of sound and the angular relation of the reflector axis to a fixed zero of the scale may readily be determined, it being noted that the index hand is preferably disposed in coplanar relation with the reflector axis whereby it will directly indicate the direction in which the reflector points.

Means are provided for facilitating a hearing of the sound at the reflector focal point, and as here shown, such means comprises the mounting of a suitable and preferably small microphone transmitter 17 on the reflector and with its diaphragm at the focal point thereof and arranged to receive a maximum amount of reflected sound from the reflector. As here shown, the transmitter 17 is carried on a spider 18 disposed generally in the plane of the front of the reflector. The transmitter 17 is included in a circuit 19 including a battery 21 and a receiver 22, whereby an operator, having the receiver to his ear, may readily determine the position of the reflector for the maximum sound intensity at the focal point thereof as the reflector is variously disposed about the standard axis. It will now, of course, be clear that by having the zero line of the scale definitely related to the ship, an angular direction of a sound source relative to the ship may be readily determined, it being noted that a preferable arrangement would be to have the zero line point forwardly of the standard axis and longitudinally of the ship with the scale calibrated both ways from the zero line for one hundred eighty degrees.

It will now be noted that if two of the units 5 having their scales similarly related to a ship 23 are simultaneously operated at spaced points of the ship, the angles to a given sound source 24 will, in general, differ somewhat, whereby, by knowing the distance between the units, a solution of the triangle defined by the two reflector axes and the line joining the units, as by the law of sines, will give the distance from either unit to the sound source. If, however, the sound source lies on or very near the line joining the units a determination in the manner described is not possible, and the ship must either be turned slightly from its course or a third unit used at a position somewhat to one side of the line of the first two units. When but two units are used, as is herewith particularly illustrated, one unit is preferably placed at the bow of the ship and the other amidship and at one side thereof, whereby the line joining the units is obliquely related to the longitudinal axis of the ship in a direction in which an inaccuracy of determination is less serious, it being noted that the directions in which accuracy is usually most important are straight-ahead and transversely of the ship.

Means are preferably provided for facilitating the rotation of the reflector in effecting a setting of a unit, and as here shown a wheel 26 is provided on the standard for such purpose.

I claim:

1. In a device for determining the direction of a sound source from a given point, a parabolic reflector at said point adjustable about a vertical axis and arranged to concentrate sound from said source at the focal point thereof, and means for ascertaining variations in the intensity of sound at said point for the different adjusted positions of said reflector, and comprising a single sound collecting unit positioned in such relation to the reflector that the focal point of the latter will lie within the unit.

2. In a device for determining the direction of a sound source from a given point, a concavely curved reflector adjustably mounted at said point and arranged to concentrate sound from said source at a focal point thereof, and means for ascertaining variations in the intensity of sound at said focal point for different adjusted positions of the reflector, said means including a microphone transmitter having the diaphragm thereof disposed at said focal point and connected in a circuit including a source of current and a receiver.

3. In a device for locating a source of sound from a ship, concave sound reflectors disposed at spaced and fixedly related observation points on said ship and adjusted about vertical pivotal axes with the axes of curvature limited to movement in a plane perpendicular to said first axes, means including a microphone for ascertaining the variations in the intensities of sound at the focal points of said reflectors during the adjustment thereof whereby they may be set in such positions that the intensities of sound at their focal points are maximums and their axes of curvature are directed in a plane including their focal points and said source of sound, and means for ascertaining the angular dispositions of said axes of curvature with respect to a base line fixedly related to a line joining said observation points.

In testimony whereof, I have hereunto set my hand at Oakland, California, this 10th day of September, 1927.

LELAND FISKE MERRILL.